United States Patent [19]
Nielsen et al.

[11] Patent Number: 5,732,813
[45] Date of Patent: Mar. 31, 1998

[54] HYDRAULIC HEAD PULLEY

[75] Inventors: Jens Jørgen Nielsen, Sønderborg; René Schibsbye Andersen, Sydals, both of Denmark

[73] Assignee: Danfoss A/S, Nordborg, Denmark

[21] Appl. No.: 656,187

[22] PCT Filed: Nov. 29, 1994

[86] PCT No.: PCT/DK94/00442

§ 371 Date: Aug. 15, 1996

§ 102(e) Date: Aug. 15, 1996

[87] PCT Pub. No.: WO95/15897

PCT Pub. Date: Jun. 15, 1995

[30] Foreign Application Priority Data

Dec. 8, 1993 [DK] Denmark ................... 1370/93

[51] Int. Cl.⁶ .................................................. B65G 13/06
[52] U.S. Cl. ................................................... 198/788
[58] Field of Search .............................. 198/780, 788, 198/791

[56] References Cited

U.S. PATENT DOCUMENTS

| | | | |
|---|---|---|---|
| 1,820,985 | 9/1931 | McKee | 198/788 |
| 4,013,166 | 3/1977 | Weady et al. | 198/788 X |
| 5,088,596 | 2/1992 | Agnoff | 198/788 |

FOREIGN PATENT DOCUMENTS 386809  9/1990  European Pat. Off. ............... 198/788

*Primary Examiner*—James R. Bidwell
*Attorney, Agent, or Firm*—Lee, Mann, Smith, McWilliams, Sweeney & Ohlson

[57] ABSTRACT

Motorised head pulley comprising a rotating drum, which is driven by a permanently mounted hydraulic motor situated in the pulley. Between the motor and the pulley, a reduction gear is inserted. The motor and the reduction gear comprise moving parts, which are designed for operation in contact with a water-based, lubricant-free pressure fluid. The motorised head pulley can by this be used without having to pay attention to the risk of pollution from the hydraulic medium. The motorised head pulley is especially appropriate to drive conveyors in food processing production.

12 Claims, 2 Drawing Sheets

HYDRAULIC HEAD PULLEY

BACKGROUND OF THE INVENTION

The present invention relates to a motorised head pulley with a rotating drum, which is driven by a hydraulic motor permanently mounted in the pulley.

Motorised head pulleys of the type mentioned in the introduction are known from U.S. Pat. Nos. 3,788,605 and 4,148,464, where the hydraulic motor is arranged to be driven by means of a standard oil-based hydraulic medium. It has proved, however, that it is difficult to arrange these motorised head pulleys with such a high degree of tightness that the oil-based hydraulic medium cannot possibly escape to the surroundings and pollute them. The application of these motorised head pulleys for driving for example conveyors in food processing factories such as slaughterhouses in particular, is today very restricted as a consequence of the risk mentioned that the oil-based hydraulic medium escapes to the surroundings and pollute for example foodstuff when leaks occur in the pulley or in pressure pipes.

It should also be mentioned that in addition to this last mentioned motorised head pulley, motorised head pulleys are known where the driving motor is an electro-motor, see for example U.S. Pat. No. 5,088,596. On the background of the drawbacks mentioned above, these motorised head pulleys have been used increasingly for driving conveyors especially in food processing industries, but still they involve a not inconsiderable risk of leaks at the oil lubricated transmission, which may also lead to unwanted contamination of the surroundings. The electrically driven head pulleys often have a high, unwanted generation of heat, when they have received an often pre-determined number of start/stop signals within a given period of time, and the high degree of heat generation heats in an unwanted manner the driven arrangement such as a conveyor. The high degree of heat generation causes different friction and uneven pull of the conveyor, which will quite often lead to increased wear or break-down.

SUMMARY OF THE INVENTION

The motorised head pulley according to the present invention is characterised in that a reduction gear is inserted between the motor and the pulley, and that the motor and the reduction gear comprise moving parts which are arranged for operation in contact with a water-based, lubricant-free pressure fluid.

A motorised head pulley is hereby provided, which can be used for many, different purposes, without the necessity of paying attention to a risk of pollution from the hydraulic medium, especially during operation, but also during installation and service of the motorised head pulley. The high conductivity of the water-based pressure medium will ensure a necessary and very efficient transport of the frictional heat away from the moving parts of the reduction gear.

According to the invention, the wear of the sliding surfaces is reduced at operation in water.

The invention has proven to provide a particularly functional and reliable reduction gear in connection with a hydraulic motorised head pulley.

The motorised head pulley can suitably be suspended by the shaft, for example by means of a fork-like unit gripping each shaft end, and the motorised head pulley can suitably be installed direct for replacing existing motorised head pulleys, driving for example conveyors.

The invention provides particularly efficient cooling of the reduction gear and the moving parts of the hydraulic motor, and thereby heat removal via the passing pressure fluid.

A particularly efficient heat removal from the pulley via the passing pressure fluid is ensured.

According to the present invention the plastic material can in a particularly suitable manner be polyetherether ketone reinforced with carbon fibres. However, many other types of thermoplastic materials may be used, as for example polyamide.

According to the present invention the thermoplastic material may have a content of fillers, such as glass, graphite, polytetrafluoroethylene or carbon, and especially in a fibre form.

According to the present invention the motorised head pulley can be used with particular advantage for driving conveyors in a food-processing production.

BRIEF DESCRIPTION OF THE DRAWINGS

The invention is explained in more detail in the following, with reference to the drawing, where.

DESCRIPTION OF AN EXAMPLE EMBODYING THE BEST MODE OF THE INVENTION

Figure 1:
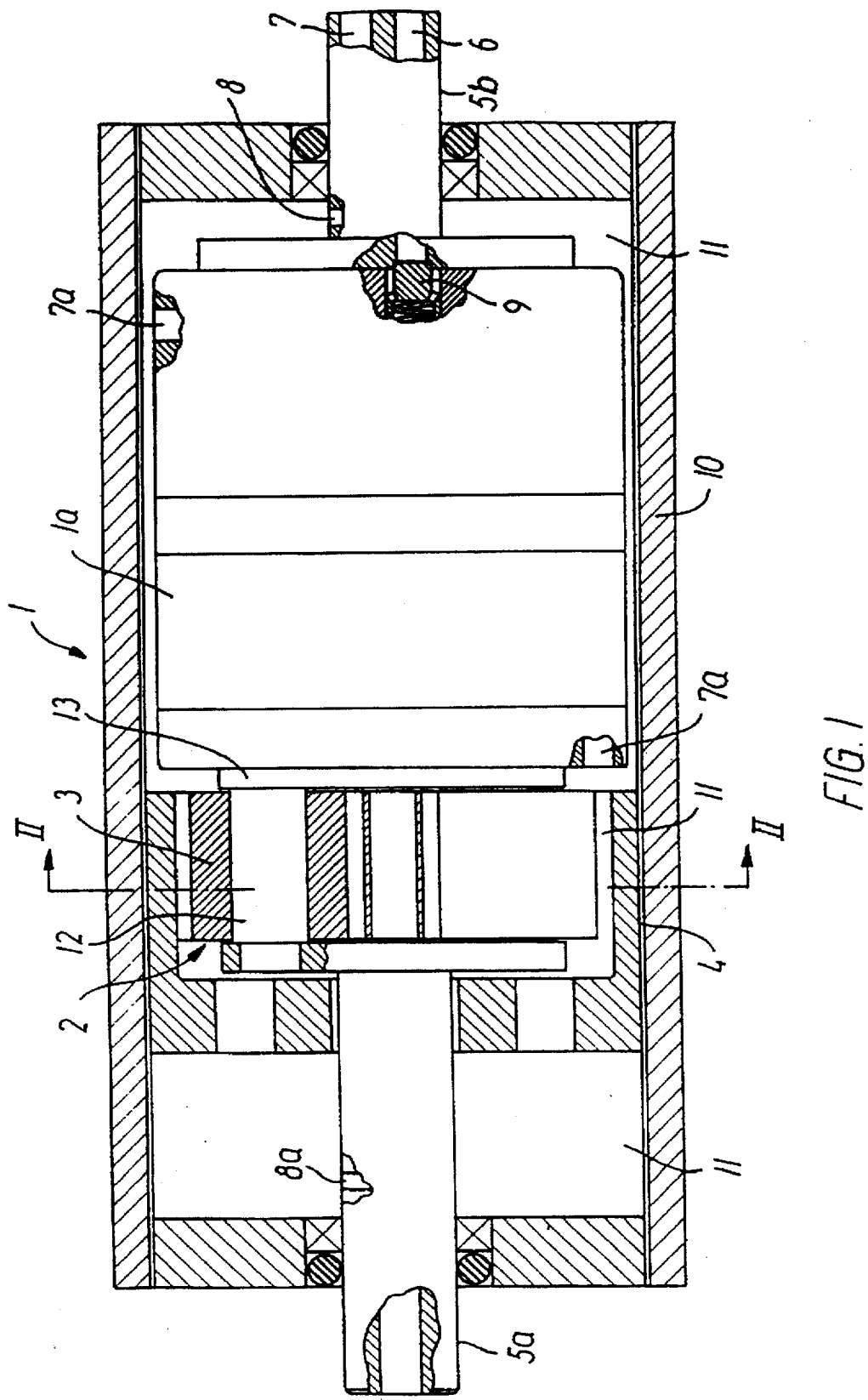
FIG. 1 shows in partially axial section a hydraulically driven motorised head pulley 1, which drives a schematically shown conveyor 10, and FIG. 2 a radial section along the line II—II through the reduction gear.
Figure 2:
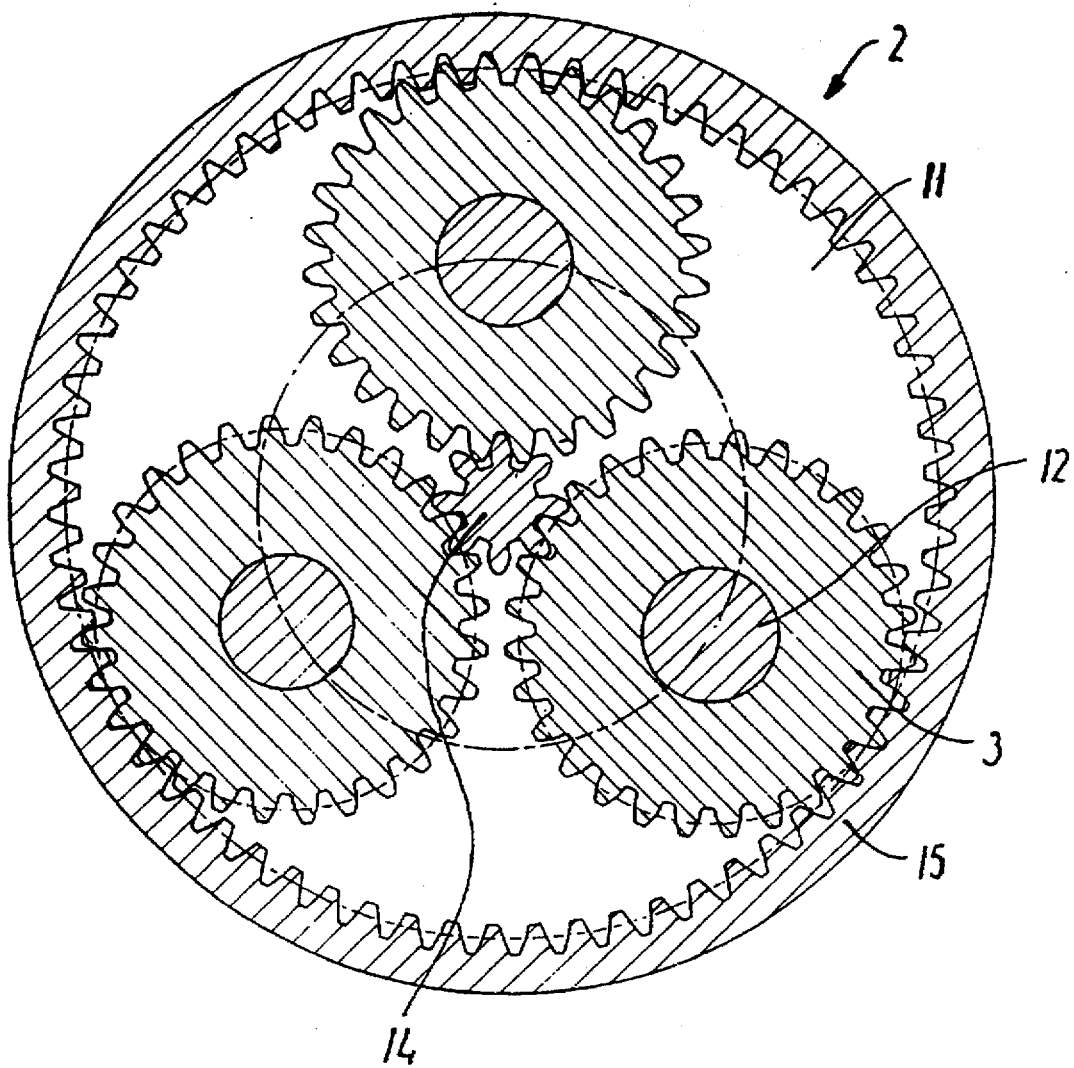

The motorised head pulley shown in FIG. 1 comprises a hydraulic motor 1a, which works on the radial piston principle in the example shown. Further, the motorised head pulley 1 comprises a permanently mounted, stationary shaft 5b, and a pulley 4 rotating around this shaft, which pulley is driven via a reduction gear 2 by the hydraulic motor 1a. In the embodiment shown, the shaft is divided into two sections 5a and 5b, and the radial piston motor 1a is inserted between them and rigidly connected with the shaft sections 5a, 5b. In the example shown, the reduction gear 2 is designed as a planet gear, which like the hydraulic motor 1a is centrally mounted in a cavity 11 in the pulley 4. The planet gear 2 comprises three gear wheels 3, which constitute the planet wheels of the planet gear, and which are pivotally suspended via the shaft journals 12 on an end flange 13 on the motor 1a. The gear wheels 3 mesh with the toothed drive shaft 14 of the hydraulic motor 1a, which drive shaft is the sun wheel of the planet gear, and which also meshes with an internally toothed rim 15 in the internal cavity 11 of the pulley 4. In the embodiment shown, the gear wheels 3 are made of the plastic material polyetherether ketone reinforced with carbon fibres. The shaft journals 12, the drive shaft 14, and the toothed rim 15 are made of metal such as rust-inhibited steel.

The moving parts of the hydraulic motor comprise pairs of sliding surfaces turned towards each other, one of which sliding surfaces is of metal, and the other sliding surface of a plastic material; the pistons may be made of metal, such as steel, and the cylinder walls may be of plastics, such as carbon fibre reinforced polyetherether ketone. The sliding surfaces of the motor, especially the radial sliding surfaces, may comprise sliding surfaces on a steel shaft and sliding surfaces on a support, such as a bushing of plastic material, especially carbon fibre reinforced polyetherether ketone.

All pairs of opposed sliding surfaces between the two mutually movable parts of the reduction gear and also between the mutually moving parts of the motor, are thus designed to be lubricated and cooled by means of a lubricant-free, water-based pressure fluid, so that the surfaces do not weld as a consequence of direct contact between the surfaces without intermediary pressure fluid. At the same time a leak occurring at the motorised head pulley will not result in pollution of the surroundings with an undesirable, oil-based hydraulic medium, as in the case of known motorised head pulleys, but only with harmless water, which is important especially when the motorised head pulley is used for driving a conveyor 10, which forms part of a food processing production. This applies in operation as well as under installation and dismantling of the motorised head pulley in connection with service.

The internal cylindrical cavity 11 of the pulley extends to immediate proximity with the external perimeter of the pulley, and generally in the whole length of the pulley 4. Hereby the pulley heat is led away in a particularly efficient manner via the passing, water-based pressure fluid.

As shown, the stationary, split shaft 5a,5b can be provided with inlets 6, and outlet 7, which are connected through orifices 8, 8a with the central cavity 11 for admission and emission, respectively, of the water-based pressure fluid in the cavity of the pulley.

Thereby the lubricant-free, water-based pressure fluid, which can preferably be corporation water, can quickly remove particularly intense heat, resulting for example by friction between the conveyor 10 and the pulley 4. Hereby a high degree of operational reliability is achieved. Similarly, the water-based pressure fluid will in a particularly efficient manner remove heat from the hydraulic motor 1a and the reduction gear 2, since both are directly surrounded by the pressure fluid. The hydraulic motor 1a may be provided with a non-return valve 9 in the inlet 6 as well as openings 7a for emitting the pressure fluid into the cavity 11.

Incidentally, the non-return valve 9 in the inlet 6 will ensure that the hydraulic motor cannot counter-rotate, which makes it redundant to provide it with further means of braking, such as a mechanical brake.

It should be mentioned that as it is known, the heat conductivity in the known, oil-based pressure liquids is much lower than in water. According to the present invention a particularly reliable and stable service of the motorised head pulley is ensured under service conditions where much heat must be removed. The heat is removed chiefly via the water-based pressure fluid, which is quite impossible in the case of the known motorised head pulleys, which are driven by means of an oil-based pressure fluid.

In conclusion it should be mentioned that many changes may be made without deviating from the principle of the invention itself. For example, the motorised head pulley can be used for driving many different transport devices under circumstances where pollution with oil of the surroundings is unwanted. At the same time, many different combinations of materials can be used for the moving parts of the transmission, including cheaper plastics such as polyamide.

We claim:

1. A motorised head pulley with a rotating pulley, which is driven by a permanently mounted hydraulic motor situated in the pulley, and including a reduction gear between the motor and the pulley, the motor and the reduction gear comprising moving parts, which are designed for operation in contact with a water-based, lubricant-free pressure fluid.

2. A motorised head pulley according to claim 1, including pairs of mutually opposed sliding surfaces on the moving parts of the hydraulic motor and the reduction gear, said pairs comprising a sliding surface of metal and a sliding surface of a plastic material.

3. A motorised head pulley according to claim 2, in which the reduction gear is a toothed gear transmission, in which meshing pairs of rows of teeth comprise a row of teeth of metal and a row of teeth of plastic material.

4. A motorised head pulley according to claim 3, in which the gear wheel transmission is a planet gear with a sun wheel of metal and planet wheels of plastic material.

5. A motorised head pulley according to claim 4, in which the hydraulic motor has a toothed drive shaft, the drive shaft being a sun wheel in the planet gear.

6. A motorised head pulley according to claim 5, in which the planet gear meshes with an internally toothed rim of metal in the pulley.

7. A motorised head pulley according to claim 1, in which the pulley is rotationally mounted on a stationary shaft, which carries the hydraulic motor, and the stationary shaft is provided with an inlet to, and an outlet from, the hydraulic motor.

8. A motorised head pulley according to claim 1, in which the pulley is a cylindrical, tubular body, enclosing a cavity through which the pressure fluid flows, the hydraulic motor and the reduction gear being located in the cavity.

9. A motorised head pulley according to claim 1, in which the pressure fluid is passed through the motorised head pulley in such a manner that during its passage at least part of the pressure fluid is in thermal contact with internal surfaces in the tubular body, which internal surfaces extend mainly in the entire length of the tubular body, and at least over part of the periphery of the tubular body.

10. A motorised head pulley according to claim 2, in which the plastic material is a polyarylether ketone.

11. A motorised head pulley according to claim 2, in the plastic material is a polyetherether ketone.

12. A motorised head pulley according to claim 2, in which the plastic material is reinforced with fibres.

* * * * *